United States Patent
Blumenauer et al.

(10) Patent No.: US 7,215,519 B2
(45) Date of Patent: May 8, 2007

(54) GROUND AND LINE FAULT INTERRUPT CONTROLLER/ADAPTER

(75) Inventors: Paul L. Blumenauer, Arlington, WA (US); Dai H. Pham, Bellevue, WA (US); Douglas S. York, Langley, WA (US); Randall P. Kellar, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 10/690,366

(22) Filed: Oct. 20, 2003

(65) Prior Publication Data

US 2005/0083617 A1    Apr. 21, 2005

(51) Int. Cl.
    *H02H 3/00* (2006.01)
(52) U.S. Cl. ............... 361/42; 317/18; 317/36; 324/536; 324/117; 439/160; 439/652
(58) Field of Classification Search ............ 361/42
    See application file for complete search history.

(56) References Cited

U.S. PATENT DOCUMENTS

| | | | | |
|---|---|---|---|---|
| 1,919,969 A | * | 7/1933 | Traver | 361/80 |
| 2,809,330 A | * | 10/1957 | Harder | 361/80 |
| 3,801,871 A | * | 4/1974 | Loh | 361/45 |
| 4,159,499 A | * | 6/1979 | Bereskin | 361/42 |
| 5,000,692 A | * | 3/1991 | Taniguchi et al. | 439/160 |
| 5,434,509 A | * | 7/1995 | Blades | 324/536 |
| 5,807,141 A | * | 9/1998 | Sexton | 439/652 |
| 5,963,405 A | * | 10/1999 | Engel et al. | 361/42 |
| 6,204,751 B1 | * | 3/2001 | Bolda et al. | 340/286.02 |
| 6,359,761 B1 | * | 3/2002 | Sid | 361/42 |
| 6,583,975 B2 | * | 6/2003 | Bax | 361/93.1 |
| 6,650,516 B2 | * | 11/2003 | Langford et al. | 361/42 |
| 6,727,682 B1 | * | 4/2004 | Tobin | 324/117 R |
| 6,980,005 B2 | * | 12/2005 | Finlay et al. | 324/424 |

* cited by examiner

*Primary Examiner*—Robert L. Deberadinis
*Assistant Examiner*—Luis E. Román
(74) *Attorney, Agent, or Firm*—Ingrassia Fisher & Lorenz, P.C.

(57) ABSTRACT

An adapter module for detecting an electronic fault condition in an electronic circuit is disclosed wherein the adapter module may include electrical fault indicator circuitry. In general, the electrical fault indicator circuitry may include ground fault indicator circuitry, line fault indicator circuitry, or ground and line fault indicator circuitry. The adapter module may also include a magnetic device capable of detecting a magnetic field between the electrical fault indicator circuitry and an electrical circuit module. The electrical circuit module may include a switch such as a circuit breaker, a relay, or a magnetically sensitive switch. The magnetic device may include a Hall effect device or a magnetic core.

41 Claims, 15 Drawing Sheets

GROUND AND LINE FAULT INTERRUPT CONTROLLER/ADAPTER

BACKGROUND OF THE INVENTION

The present invention generally relates to electrical wiring systems which are subject to fault conditions and, more particularly, to ground and line fault interrupters included in such electrical wiring systems to protect users from injury.

Electrical wiring systems are typically included in residential, commercial and industrial environments wherein electrical power is supplied to various components in the system. Generally, such electrical wiring systems include phase and neutral (or return) conductors, which when properly connected, supply electrical power to the system components.

Certain safety code requirements are in place for some electrical wiring systems wherein the safety codes require the installation of circuit protection devices that trip when certain electrical based faults occur. For example, in aviation electronics, it is desirable to have a circuit protection device in electrical wiring systems that are positioned near potential ignition sources, such as a fuel tank. One example of such a circuit protection device is a ground fault interrupter (GFI) that is responsive to the detection of ground faults.

Conventional ground fault interrupters typically use a sense transformer, such as a differential transformer, to sense a difference current in the phase and neutral conductors that pass through the transformer. The difference current is transferred to a secondary winding of the differential reference. Typically, the current at the secondary winding, known as the secondary current, is proportional to the difference current. Conventional GFI devices also include a ground/neutral transformer to detect ground faults.

Generally, when detecting ground faults from a difference current, a sense amplifier converts the secondary current to a voltage level. This voltage level is compared to two window detector reference voltages, and if one of the compared voltages exceeds a designed threshold or reference signal for a predetermined period of time, a trigger signal, representing a difference current ground fault, is generated. Generally, when detecting ground to neutral faults, the ground/neutral and sense transformers are coupled through external resistors and capacitors and a neutral wire ground loop, to form a positive feedback loop around the sense amplifier. The feedback loop causes the sense amplifier to oscillate at a frequency determined by the inductance of the secondary winding of the ground/neutral transformer and a capacitor. If the amplifier oscillates for predefined period of time, the trigger signal, representing a ground to neutral fault, is generated.

One problem in the art is that some electrical wiring systems have been designed without including a GFI device. Consequently, it would be highly desirable to retrofit such electrical wiring systems with circuitry to provide fault protection. Further, it would be desirable to retrofit such electrical wiring systems by minimally changing the existing electrical circuitry (i.e. no additional ground or neutral connections).

As can be seen, there is a need for a GFI adapter which can be implemented into existing electrical wiring systems.

SUMMARY OF THE INVENTION

In one aspect of the present invention, a fault interrupter module includes an adapter module with electrical ground and line fault interrupter circuitry. The electrical ground and line fault interrupter circuitry includes at least one magnetic device capable of detecting a magnetic field from at least one fault current. The electrical ground and line fault interrupter circuitry also includes multiple conductive windings magnetically coupled to the at least one magnetic device. The electrical ground and line fault interrupter circuitry further includes a current interrupter circuit electrically connected to the multiple conductive windings. The current interrupter circuit is capable of detecting a ground fault signal from a first output of the multiple conductive windings and a line fault signal from a second output of the multiple conductive windings. Further, the current interrupter circuit is capable of outputting an electronic fault signal when at least one of the ground and line fault signals are detected.

In another aspect of the present invention, a fault interruption module includes an adapter module with electrical ground and line fault interrupter circuitry. The electrical ground and line fault interrupter circuitry includes at least one magnetic core capable of detecting a magnetic field from at least one fault current. The electrical ground and line fault interrupter circuitry also includes multiple conductive windings magnetically coupled to the at least one magnetic core. The electrical ground and line fault interrupter circuitry further includes a first sensing circuit with first and second inputs. The first input of the first sensing circuit is electrically connected to the first output of the multiple conductive windings and the second input of the first sensing circuit is electrically connected to the second output of the multiple conductive windings. The electrical ground and line fault interrupter circuitry also includes a second sensing circuit with first and second inputs. The first input of the second sensing circuit is electrically connected to the first output of the multiple conductive windings and the second input of the second sensing circuit is electrically connected to the second output of the multiple conductive windings. The electrical ground and line fault interrupter circuitry also includes a current interrupter circuit with an input and an output. The input of the current interrupter circuit is electrically connected to an output of the first sensing circuit and an output of the second sensing circuit. Further, the output of the current interrupter circuit is capable of outputting an electronic fault signal.

In still another aspect of the present invention, a fault interrupter module includes a socket in electrical communication with external electronic circuitry, an adapter module which includes electrical fault indicator circuitry, and a fault interruption circuit module plugged into the socket through the adapter module. The adapter module includes at least one magnetic device capable of detecting an electrical fault in the at least one fault interruption circuit module.

In yet another aspect of the present invention, a fault interruption module includes a relay socket module electrically connected to external electrical circuitry and an adapter module fixedly attached to the relay socket module. The adapter module includes electrical ground and line fault interrupter circuitry. The ground and line fault interrupter circuitry includes at least one magnetic core capable of detecting a magnetic field from at least one fault current. The ground and line fault interrupter circuitry also includes multiple conductive windings with a first output and a second output where the multiple conductive windings are magnetically coupled to the at least one magnetic core. The ground and line fault interrupter circuitry further includes a current interrupter circuit electrically connected to the multiple conductive windings where the current interrupter circuit is capable of detecting a ground fault from the first output of the multiple conductive windings and a line fault from the second output of the multiple conductive windings. The current interrupter circuit is also capable of outputting an electronic fault signal when at least one of the ground and line faults are detected. The ground and line fault interrupter circuitry further includes a relay module electromagnetically coupled with the electrical ground and line fault circuitry. The ground and line fault interrupter circuitry is in electrical communication with the relay socket module through conductive interconnects extending through the at least one magnetic core. Further, the relay module includes a switch capable of receiving the electronic fault signal.

In a further aspect of the present invention, a method of detecting an electronic fault in an electrical wiring system includes steps of detecting a magnetic field from a fault current flowing through a switch in the electrical wiring system; converting the fault current into a ground fault signal and a line fault signal; measuring the ground fault signal by comparing the ground fault signal to a ground fault reference signal; measuring the line fault signal by comparing the line fault signal to a line fault reference signal; opening the switch to create an open circuit when the ground fault signal is greater than or equal to the ground fault reference signal; and opening the switch to create an open circuit when the line fault signal is greater than or equal to the line fault reference signal.

In still yet another aspect of the present invention, a method for detecting an electronic fault in an electrical wiring system includes the steps of providing a three phase circuit electrically connected to an impedence load through at least one conductive interconnect and at least one switch; measuring a current flowing through the at least one conductive interconnect to determine a ground fault signal and a line fault signal; comparing the ground fault signal with a ground reference current and comparing the line fault signal with a line reference current; and opening the switch to create an open circuit if the ground fault signal is greater than or equal to the ground reference current or if the line fault signal is greater than or equal to the line reference current.

In another aspect of the present invention, a method of providing electronic fault detection in an electrical wiring system includes steps of providing at least one electrical circuit module in electrical communication with a connection in the electrical wiring system, the at least one first electrical circuit module including at least one electrical interconnect and at least one switch; removing the at least one first electrical circuit module from the connection in the electrical wiring system; providing an adapter module which includes electrical ground and line fault indicator circuitry where the adapter module is positioned in the connection in the electrical wiring system; positioning the at least one electrical circuit module on the adapter module where the at least one electrical interconnect extends through the electrical ground and line fault indicator circuitry to make electrical contact with the electrical wiring system; detecting a fault current flowing through the at least one first electrical circuit to the electrical wiring system; transmitting a fault signal from the adapter module to the at least one switch; and opening the at least one switch when the fault signal is detected by the at least one switch.

In a further aspect of the present invention, a fault interrupter module for an electrical wiring system with a switch includes means for detecting a fault current in the electrical wiring system; means for converting the fault current into an electrical ground fault signal and an electrical line fault signal; means for comparing the electrical ground fault signal to a ground fault reference current; means for generating a fault signal if the electrical ground fault signal is greater than or equal to the ground fault reference current; means for comparing the electrical line fault signal to a line fault reference current; means for generating the fault signal if the electrical line fault signal is greater than or equal to the line fault reference current; and means for transmitting the fault signal to the switch in the electrical wiring system where the switch opens when the fault signal is detected.

These and other features, aspects, and advantages of the present invention will become better understood with reference to the following drawings, description, and claims.

DETAILED DESCRIPTION OF THE INVENTION

The following detailed description is of the best currently contemplated mode of carrying out the invention. The description is not to be taken in a limiting sense, but is made merely for the purpose of illustrating the general principles of the invention, since the scope of the invention is best defined by the appended claims.

The present invention generally provides a method and apparatus for detecting an electrical fault in an electrical wiring system. Electrical wiring systems or electronic circuitry are typically found in liquid or gas pump circuitry or circuitry for motors. One such circuit may be a fuel pump circuit for automobiles or airplanes. Electrical wiring systems are also used in space applications in flammable environments such as environments including oxygen or the like. In these electrical wiring systems, it is useful to detect and remove the electrical fault quickly to avoid ignition of a flammable material.

In general, electrical faults can include ground faults or line faults. A ground fault occurs when a current flowing through a wire is unintentionally shorted to a grounded conductive structure. Ground faults may occur when insulation surrounding the wire becomes frayed so that the wire is exposed. The exposed wire may then become an ignition source if arcing occurs, for example. Similarly, a line fault may occur when a first current flowing through a first wire is unintentionally shorted to a second current flowing through a second wire. The potential difference between the first and second wires can also cause arcing.

Prior art electrical systems, such as those found in aircraft fuel pump circuitry, have been designed without including electrical fault detection. Consequently, these prior art systems cannot detect or prevent an electrical fault before any damage occurs. Further, these prior art electrical systems are expensive and time consuming to remove and replace with new electrical fault detection circuitry. The present invention allows prior art electrical wiring systems to be retrofitted with circuitry to provide fault protection. Further, the present invention allows prior art electrical wiring systems to be retrofitted with minimal changes to the existing electrical circuitry.

Figure 1:
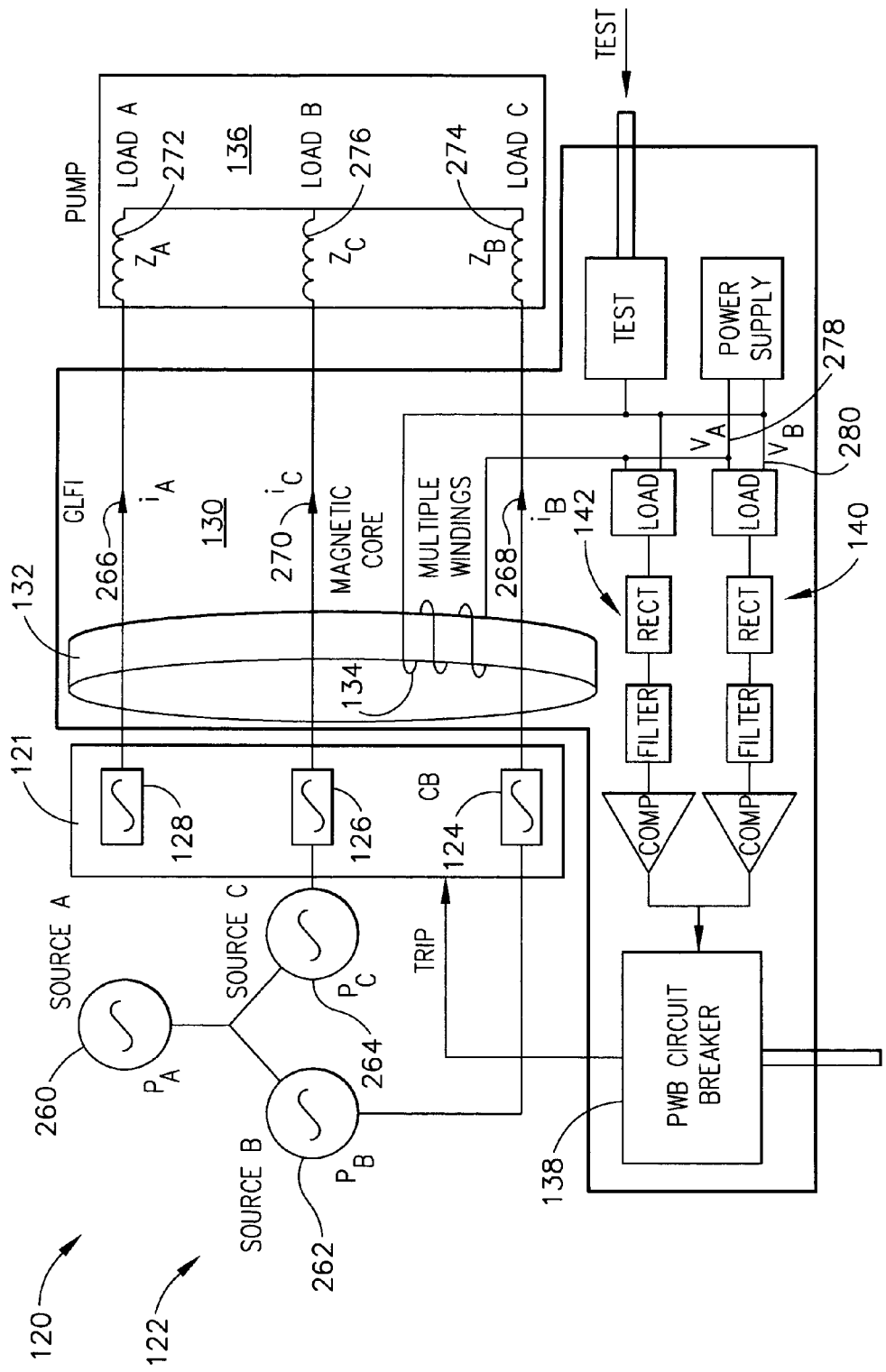
FIG. 1 is a block diagram of an electronic circuit with ground and line fault circuitry in accordance with the present invention.

Turn now to FIG. 1 which illustrates a block diagram of an electronic circuit 120 with ground and line fault circuitry. Circuit 120 may include a ground and line fault interrupter (GLFI) 130 with a magnetic core 132. Multiple conductive windings 134 may be wrapped around magnetic core 132. Further, multiple conductive windings 134 may be electrically connected to sensing circuits 140 or 142. Sensing circuits 140 and 142 may include an impedance electrically connected to a comparator through an electronic filter and a rectifier. Outputs of the comparator included in circuits 140 and 142 may then be OR'd together using an OR gate and electrically connected to a circuit breaker detector 138.

A test circuit and a power supply may be electrically connected to multiple conductive windings 134 as illustrated and a reset circuit may be electrically connected to circuit breaker detector 138. The power supply may include a three phase, 115 VAC system in which external connections may not be required. The purpose and function of the test and reset circuits will be discussed separately.

Circuit breaker detector 138 may be electrically connected to a circuit breaker system 121. Further, circuit breaker detector 138 may transmit an electronic fault signal to circuit breaker system 121 if a fault condition is detected to electrically activate system 121, as will be discussed separately. Circuit breaker system 121 may include circuit breakers 124, 126, and 128 which may be electrically connected to a three phase system 122. It will be understood that three-phase system 122 may be for a pump, a motor, or the like. Three phase system 122 may include electrical sources $P_A$ 260, $P_B$ 262, and $P_C$ 264 electrically connected to provide three phase power to an electrical load 136. Electrical load 136 may include impedance loads $Z_A$ 272, $Z_B$ 274, and $Z_C$ 276 electrically connected to $P_A$, $P_B$, and $P_C$, respectively, through circuit breakers 128, 124, and 126, respectively. It will be understood that electrical sources $P_A$ 260, $P_B$ 262, and $P_C$ 264 may include AC voltage or current sources which supply currents $i_A$ 266, $i_B$ 268, and $i_C$ 270 to loads $Z_A$ 272, $Z_B$ 274, and $Z_C$ 276, respectively. It will also be understood that three phase system 122 may include a delta connection between electrical sources $P_A$ 260, $P_B$ 262, and $P_C$ 264, but a wye connection is illustrated in FIG. 1 for simplicity and ease of discussion.

In circuit 120, magnetic core 132 may include a multi-fault detection core designed to detect both ground and line faults. The multi-fault detection core may include multiple conductive windings 134 which are electronically monitored to indicate two fault conditions (i.e. a ground fault and a line fault). Multiple conductive windings 134 may be summed together to provide two outputs at nodes $V_A$ 278 and $V_B$ 280. One node out of $V_A$ 278 or $V_B$ 280 may be directly proportional to a ground fault level for ground fault detection. The other node of $V_A$ 278 or $V_B$ 280 may be proportional to a line fault level for line fault detection.

Nodes $V_A$ 278 and $V_B$ 280 may be electrically connected to sensing circuit 142 and sensing circuit 140, as illustrated. As mentioned above, sensing circuits 140 and 142 both may include an impedance electrically connected to a comparator through an electronic filter and a rectifier. The load provides a voltage drop which is rectified and filtered. The electronic filter characteristics may be adjusted to balance a trip time with a number of false trips.

Once a voltage at node $V_A$ 278 or $V_B$ 280 has been filtered, the output may be compared with a reference voltage by the comparator included in sensing circuit 140 or 142. The reference voltage may determine a threshold of the current level trip, $i_{fault}$, where $i_{fault}$ may be equal to at least one of $i_A$ 266, $i_B$ 268, or $i_C$ 270. It will be understood that $i_{fault}$ can be equal to a ground fault reference signal, $i_{gnd\,fault}$, or a line fault reference signal, $i_{line\,fault}$, as will be discussed in more detail below. Each comparator in sensing circuits 140 and 142 may then be OR'd together using an OR gate so each circuit 140 and 142 can individually trip circuit breaker detector 138. The trip time may be in a range as fast as approximately 1 milliseconds (ms) to 10 ms. Once circuit breaker detector 138 trips, an output of detector 138 transmits the electronic fault signal to the appropriate circuit breaker included in circuit breaker system 121 to electrically activate the appropriate circuit breaker. Under normal conditions when no fault has been detected as defined above, circuit breakers 124, 126, and 128 may remain closed (i.e. circuit breakers 124, 126, and 128 form a short circuit between three phase system 122 and electrical load 136).

The test circuit may include a test switch for manual testing of electronic circuit 120 wherein the test switch may input the fault current, $i_{fault}$, through electrical nodes $V_A$ 278 or $V_B$ 280 when pressed. A successful test may be indicated when the test switch is pressed and circuit breaker detector 138 trips at least one of circuit breakers 124, 126, or 128, indicating a fault has occurred.

The reset circuit may include a mechanically latching visual trip indicator (not shown). Once tripped, the trip indicator may remain latched in the trip position until it is manually reset by sending a signal to circuit breaker detector 138.

Figure 2:
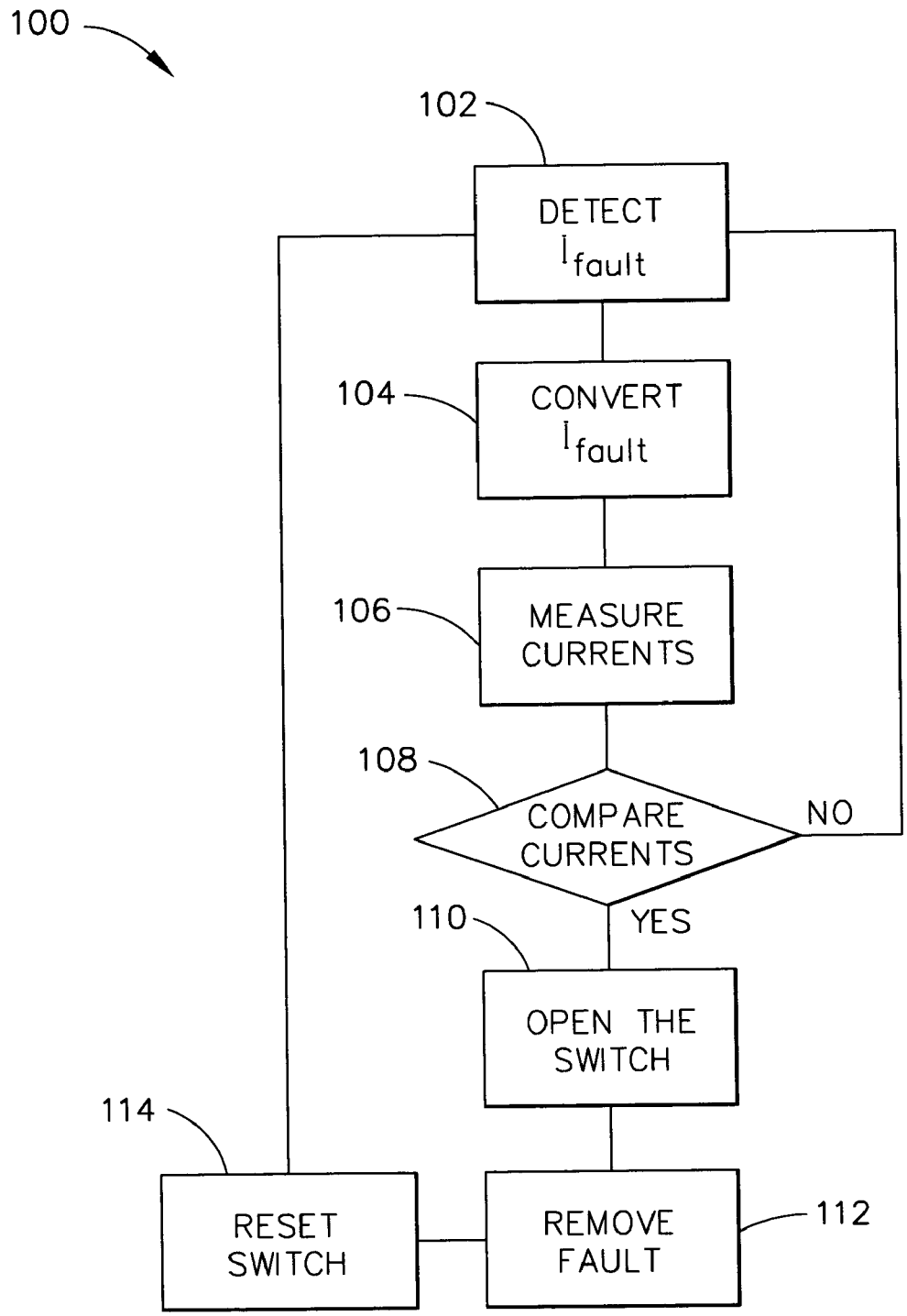
FIG. 2 is a flowchart of a method for detecting an electronic fault in the electronic circuit illustrated in FIG. 1.

Referring now to FIG. 2, an exemplary embodiment of a method 100 of detecting an electronic fault in electronic circuit 120 is illustrated by a flowchart. Exemplary method 100 may include steps 102, 104, 106, 108, 110, 112, and 114, which delineate method 100 for purposes of illustration. Method 100 is illustrated with reference to FIG. 1.

Method 100 begins with a step 102. At step 102, a magnetic field from a fault current, $i_{fault}$, flowing through at least one of circuit breakers 124, 126, or 128 is detected. At a step 104, the fault current, $i_{fault}$, is converted into a ground fault signal or a line fault signal by multiple conductive windings 134 which are magnetically coupled to multiple conductive windings 134.

At a step 106, the ground fault signal is measured by comparing the ground fault signal to a ground fault reference signal as determined by sensing circuit 140 or 142 and the number of turns in multiple conductive windings 134. Additionally, at step 106, the line fault signal is measured by comparing the line fault signal to a line fault reference signal as determined by sensing circuit 140 or 142 and the number of turns in multiple conductive windings 134. When the ground fault signal is greater than or equal to the ground fault reference signal, then a ground fault has occurred. When the line fault signal is greater than or equal to the line fault reference signal, then a line fault has occurred.

At a step 108, it is determined by sensing circuit 140 or 142 whether or not a ground or line fault has occurred. If neither a ground or line fault has occurred then, then step 102 is repeated. In a step 110, if either a ground or a line fault has occurred, then the appropriate circuit breaker is opened or electrically activated by the electronic fault signal to create an open circuit (i.e. circuit breaker 124, 126, or 128 may form an open circuit between three phase system 122 and electrical load 136). In a step 112, the electronic fault condition is removed and in a step 114, circuit breaker 138 detector is reset. After the electronic fault condition has been removed and circuit breaker detector 138 has been reset, then step 102 may be repeated.

Turning back to FIG. 1, circuit 120 monitors a three phase root mean square current sum and individual phase currents passing through three phase system 122. As mentioned above, circuit breaker detector 138 may open one of circuit breakers 124, 126, or 128 when any of the fault current thresholds are exceeded by generating the electronic fault signal. Circuit breaker detector 138 may trip one of circuit breakers 124, 126, or 128 within 1 ms to 10 ms of a detected fault. The 10 ms maximum trip time generally includes both the fault current detection time and the trip time. When circuit breaker detector 138 trips due to a fault, detector 138 may remain in the tripped state until manually reset by the reset circuit and the fault condition has been removed.

A ground fault in circuit 120 may be a low resistance return path to sources $P_A$ 260, $P_B$ 262, or $P_C$ 264 through a conductive path other than the conductive path which flows through impedence loads $Z_A$ 272, $Z_B$ 274, or $Z_C$ 276. For example, referring to currents $i_A$ 266, $i_B$ 268, and $i_C$ 270, a ground fault in circuit 120 may exist if currents $i_A + i_B + i_C \neq 0$. A ground fault signal may be generated if $i_A + i_B + i_C \geq i_{gnd\ fault}$, where $i_{gnd\ fault}$ is generally within a range from approximately 0.5 amps to 4.0 amps. If $i_A + i_B + i_C \neq 0$, then the current may not be balanced because a portion of one of the currents $i_A + i_B + i_C$ may be returning to three phase system 122 by an unintended fourth path.

A line fault (or line-to-line fault) in circuit 120 may be a low resistance conduction path between at least two of the conductive paths which flow through impedence loads $Z_A$ 272, $Z_B$ 274, or $Z_C$ 276. In the event of a line-to-line fault, several conditions may apply. In one condition, $i_A = -i_B = i_{line\ fault}$ wherein $i_{fault}$ is greater than the fault current. In another condition, $i_A = -i_C = i_{line\ fault}$. In still another condition, $i_B = -i_C = i_{line\ fault}$. For a line fault, $i_{line\ fault}$ may be 90 Amps root mean square in one or more circuit breakers 124, 126, or 128. These conditions are different from a ground fault in that the current is flowing in at least two of the impedence loads $Z_A$ 272, $Z_B$ 274, or $Z_C$ 276. A line fault condition generally exists when one or more of the loads $Z_A$ 272, $Z_B$ 274, or $Z_C$ 276 are bypassed and a very large current exists. The condition that $i_A + i_B + i_C = 0$ may still be true, but the very large current condition may cause damage to three phase system 122 or loads $Z_A$ 272, $Z_B$ 274, or $Z_C$ 276, or both three phase system 122 and loads $Z_A$ 272, $Z_B$ 274, or $Z_C$ 276.

It will be understood that electronic circuit 120 may include other electromagnetic switches in series with three phase system 122 and electrical load 136. For example, circuit breaker system 121 may include a relay system or a similar electromagnetic switch which can be tripped by circuit breaker detector 138 or a similar interrupter detector system when a fault indication is generated. For example, the interrupter detector system can include magnetic coils magnetically coupled to a relay switch included in the relay system.

In the above discussion, circuit breaker system 121 (or a relay system) of electronic circuit 120 may already be positioned within an existing electrical wiring system without a ground and line fault indicator function. In this case, it may be desirable to add GLFI 130 while still using an existing circuit interruption portion (i.e. circuit breaker system 121). Further, it may be desirable to keep GLFI 130 as separate portions of electronic circuit 120 to facilitate the replacement of the existing circuit interruption portion. This may be useful since the circuit interruption portion is generally the lowest reliable part by approximately seven orders of magnitude and, consequently, requires replacement more often. Further, a circuit interruption portion with GLFI 130 built in the same module may increase the fabrication cost by approximately a factor of four to five. In consideration of these issues, several embodiments of fault interrupter modules will be discussed presently.

Figure 3:
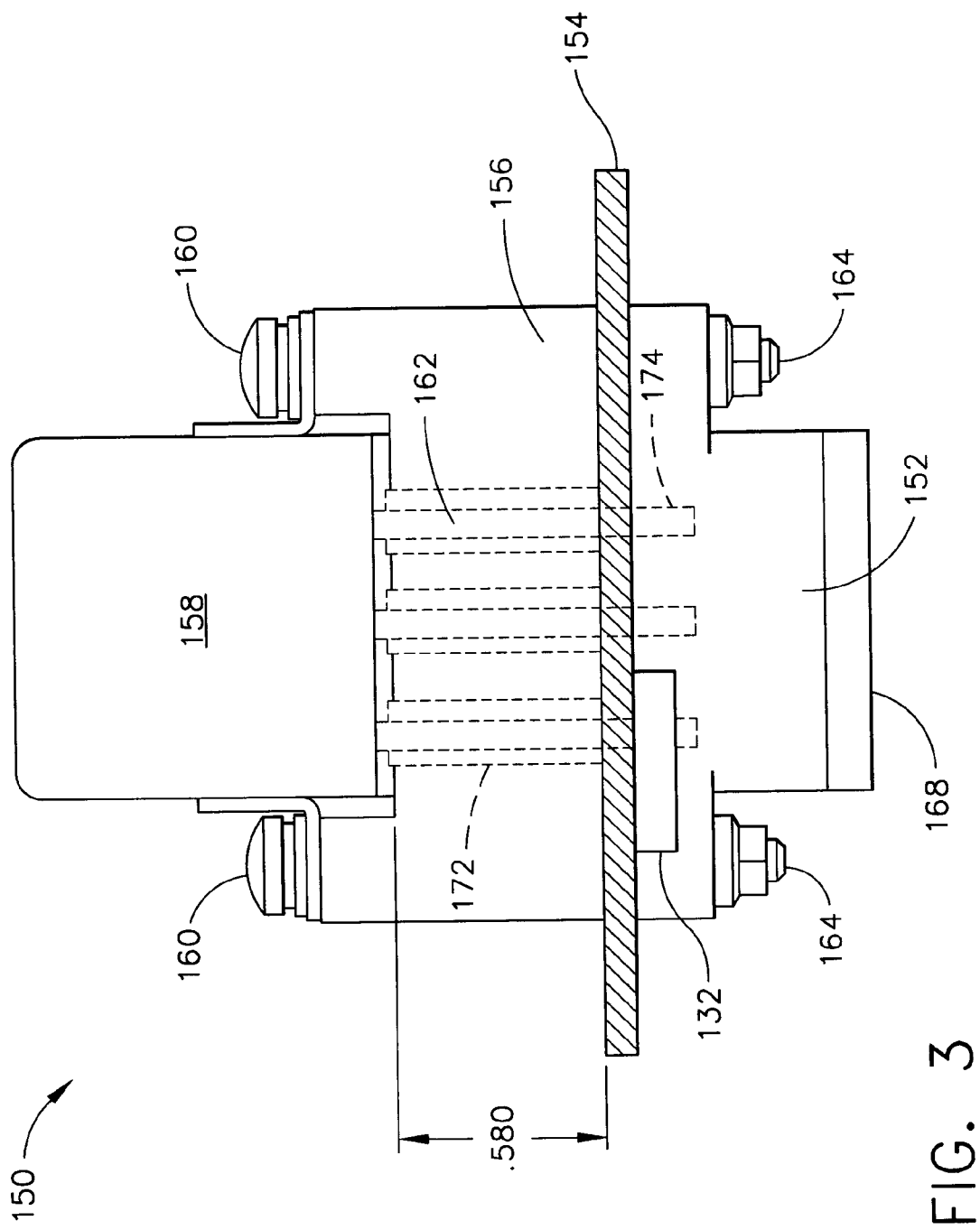
FIG. 3 is cross sectional view of a fault interrupter module in accordance with the present invention.

Turn now to FIG. 3 which illustrates a cross sectional view of a fault interrupter module 150 in accordance with the present invention wherein module 150 may include electronic circuit 120. In this embodiment, electronic circuit 120 may include a relay system as described above instead of circuit breaker system 121. Module 150 may include a socket 152 mounted on a panel 154 where panel 154 may include electronic circuitry in electrical communication with socket 152 and an external electrical system (not shown). The external electrical system may be in electrical communication with, for example, a fuel pump circuit, a motor circuit, a gas pump circuit, or the like. Module 150 also may include an adapter module 156 mounted onto socket 152 wherein socket 152 may include a relay socket or the like. Further, an encapsulant 168 may be positioned on socket 152 as illustrated to provide protection of the electronic components included therein.

Adapter module 156 may include electrical fault indicator circuitry (i.e. GLFI 130 (See FIG. 1)) as described above. Electrical circuit module 158 may be mounted onto adapter module 156 as illustrated using bolts 160 and nuts 164. It will be understood, however, that module 150 may be held together by using screws, clamps, an adhesive, a clasp, friction, or the like.

As mentioned above, electrical circuit module 158 may include a relay module instead of circuit breaker system 121. Module 158 may include external electrical interconnects 162 extending from module 158 and through relay interconnect throughholes 172 in adapter module 156. The external electrical interconnects may make an electrical connection to socket 152 and, consequently, the external electrical system. External electrical interconnects 162 may extend through magnetic core 132 so that multiple conductive windings 134 may measure the magnetic field from the current flowing through external electrical interconnects 162 when a fault condition exists (i.e. $i_{gnd\ fault}$ or $i_{line\ fault}$).

In fault interrupter module 150, socket 152 and electrical circuit module 158 may already be positioned in the electrical wiring system as discussed above. To add adapter module 156, electrical circuit module 158 may be detached from socket 152 and replaced with adapter module 156. Electrical circuit module 158 may then be positioned on electrical circuit module 158 as illustrated and as described above.

Hence, adapter module 158 with the ground and line fault indicator function can be positioned within the electrical wiring system with minimal impact and cost to the existing electrical wiring system. Further, if electrical circuit module 158 should fail, then module 158 may be replaced without having to replace or remove adapter module 156.

Figure 4:
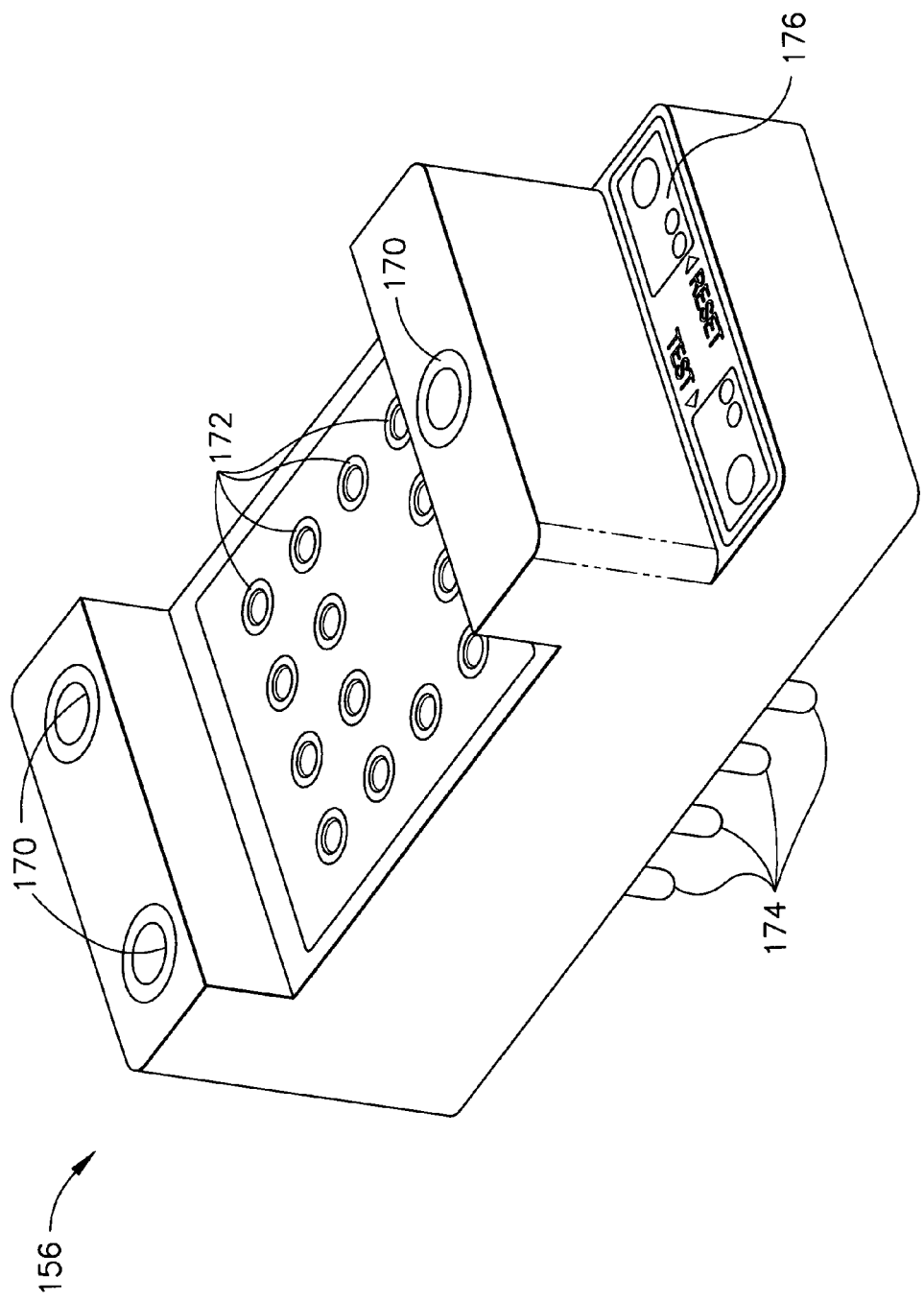
FIG. 4 is an oblique view of an adapter module included in the fault interrupter module illustrated in FIG. 3.

Turn now to FIG. 4 which illustrates an oblique view of adapter module 156 illustrated in FIG. 3. Adapter module 156 includes bolt throughholes 170 mounted on a periphery for bolts 160 to slide through. As mentioned above, relay interconnect throughholes 172 are capable of receiving external electrical interconnects 162 of electrical circuit module 158. The external electrical interconnects of electrical circuit module 158 may be in electrical communication with socket pins 174 which may be in electrical communication with socket 152. A control circuit panel 176 may be positioned on adapter module 156 as illustrated to provide control switches for test and reset circuits of GLFI circuit 130 as discussed above.

Turn now to FIGS. 5 through 9 which show various views of a printed wiring board 180 which may be included in adapter module 156. Printed wiring board 180 may include an electronic circuit board, a co-fired ceramic, or the like, wherein an electrical circuit can be formed on printed wiring board 180.

Figure 5:
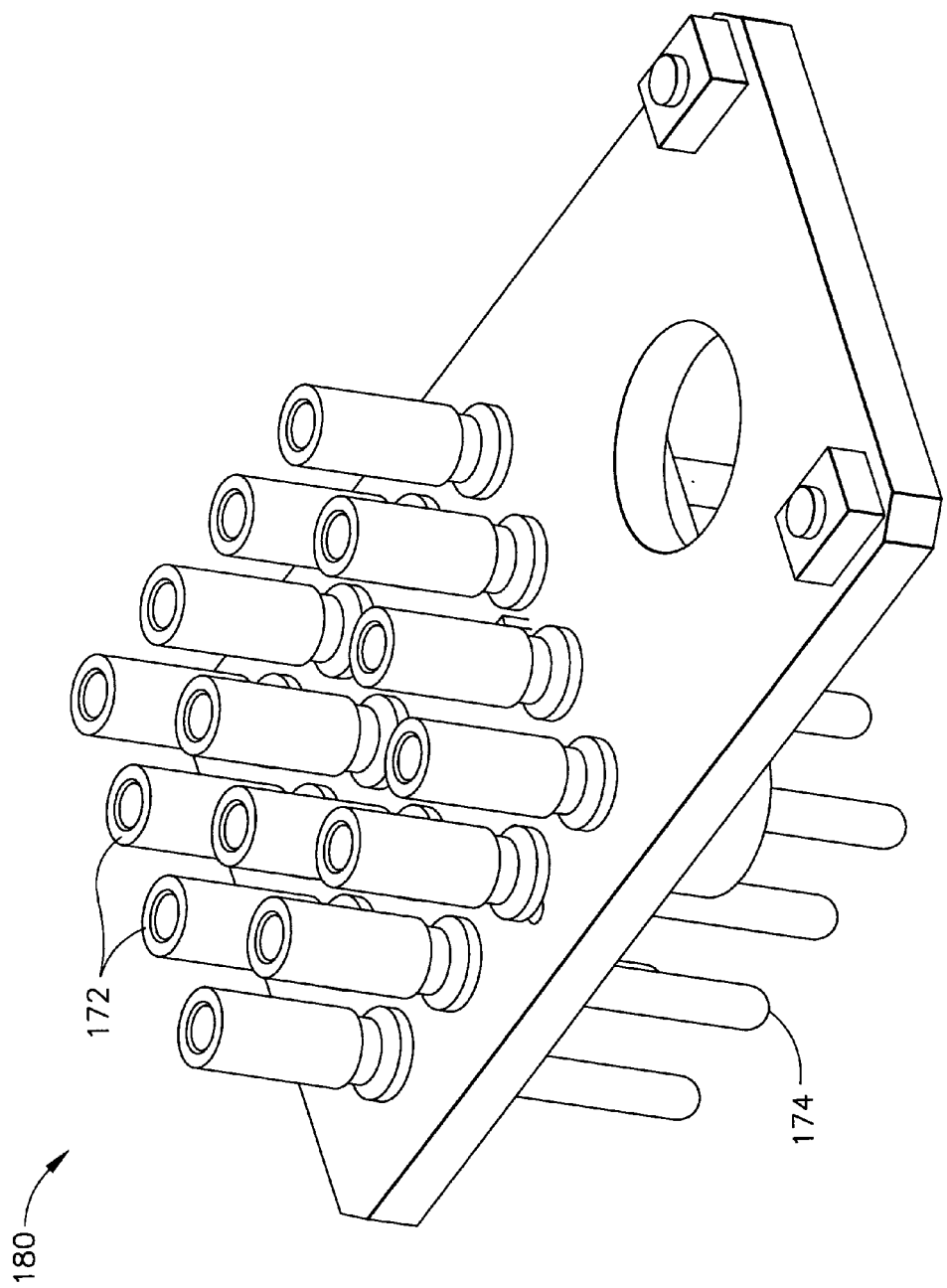
FIG. 5 is an oblique view of a top of a printed wiring board included in the adapter module illustrated in FIG. 3.
Figure 6:
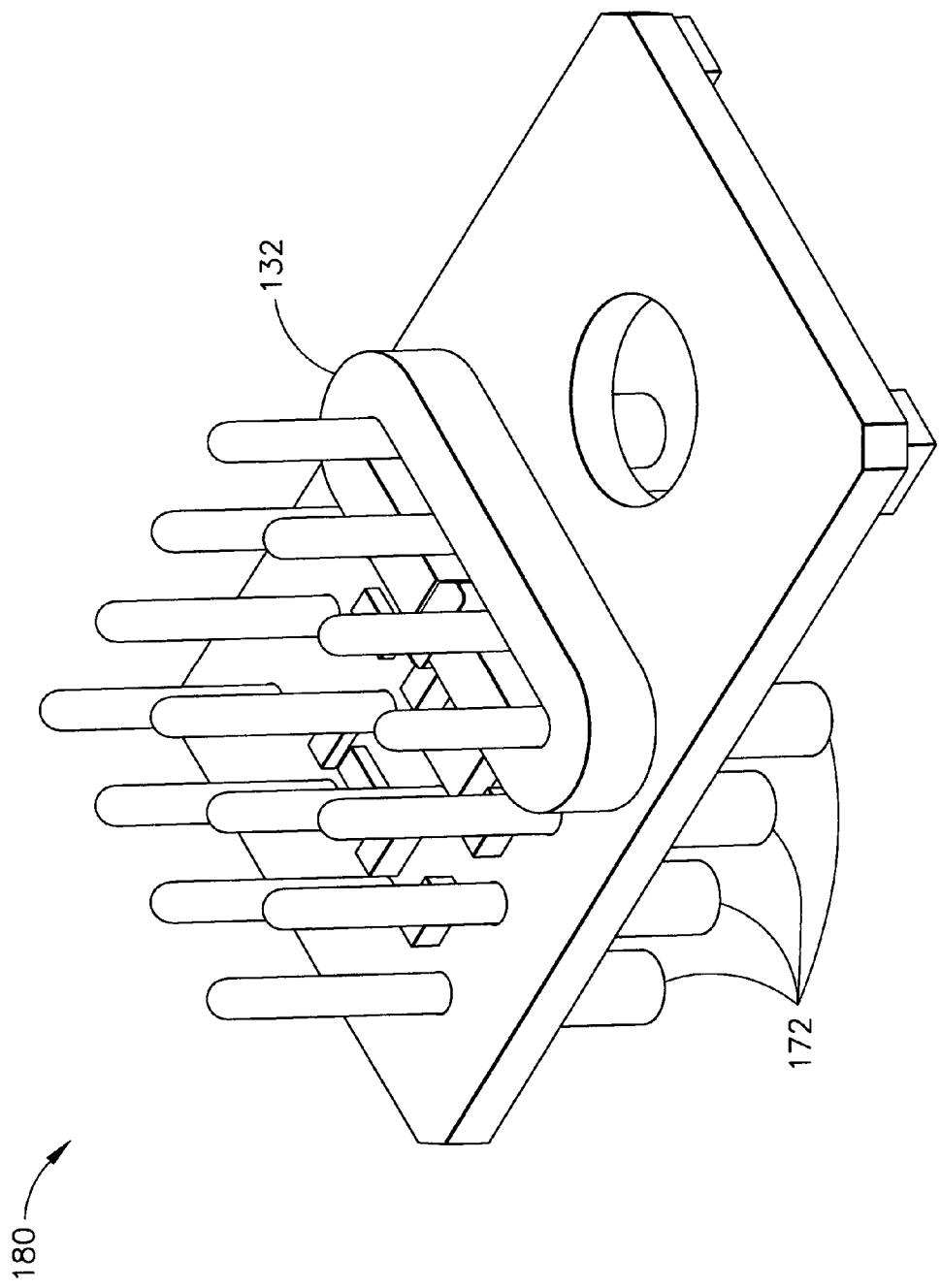
FIG. 6 is a an oblique view of a bottom of the printed wiring board included in the adapter module illustrated in FIG. 3.
Figure 7:
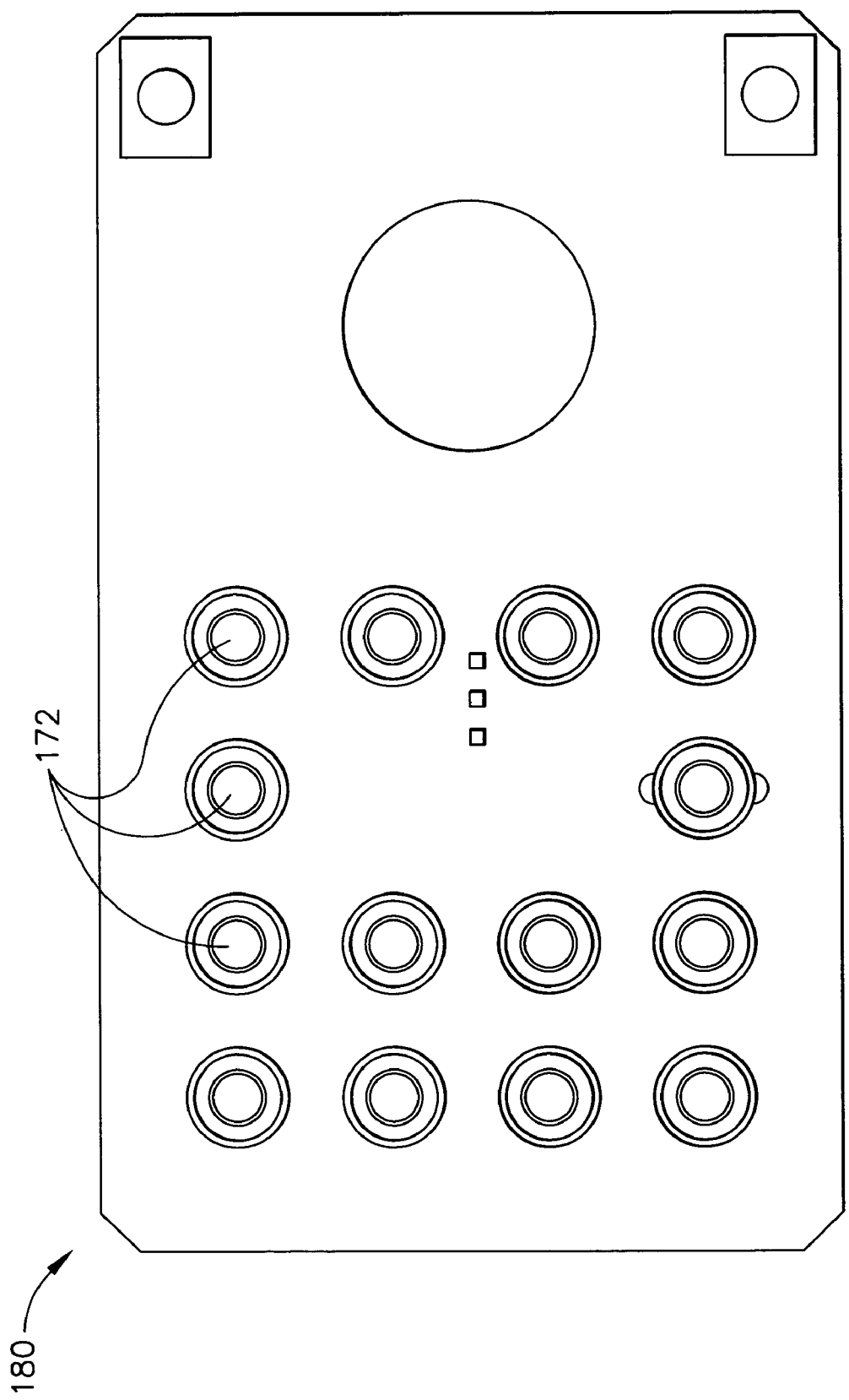
FIG. 7 is a top plan view of the printed wiring board included in the adapter module illustrated in FIG. 3.
Figure 8:
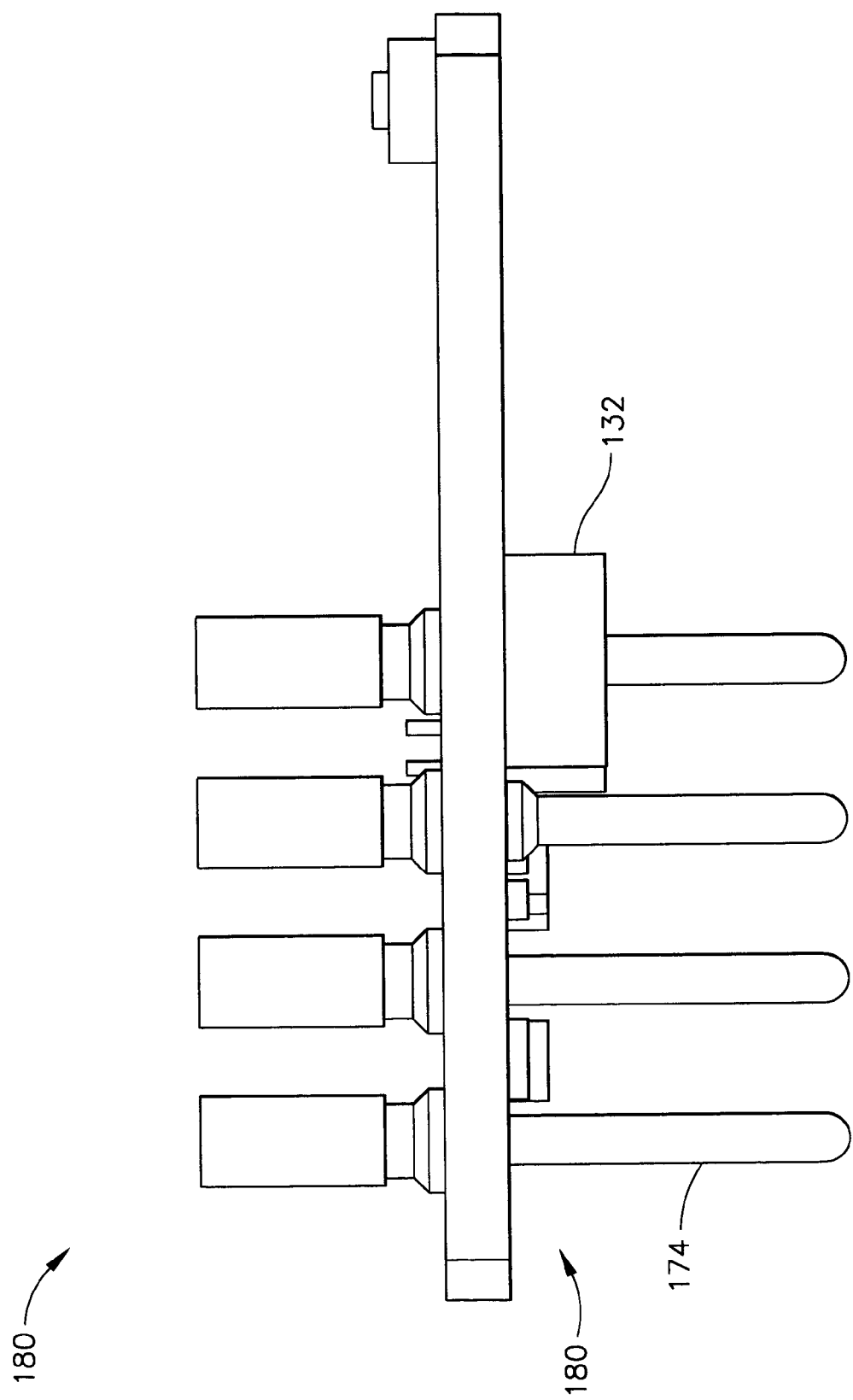
FIG. 8 is a side view of the printed wiring board included in the adapter module illustrated in FIG. 3.
Figure 9:
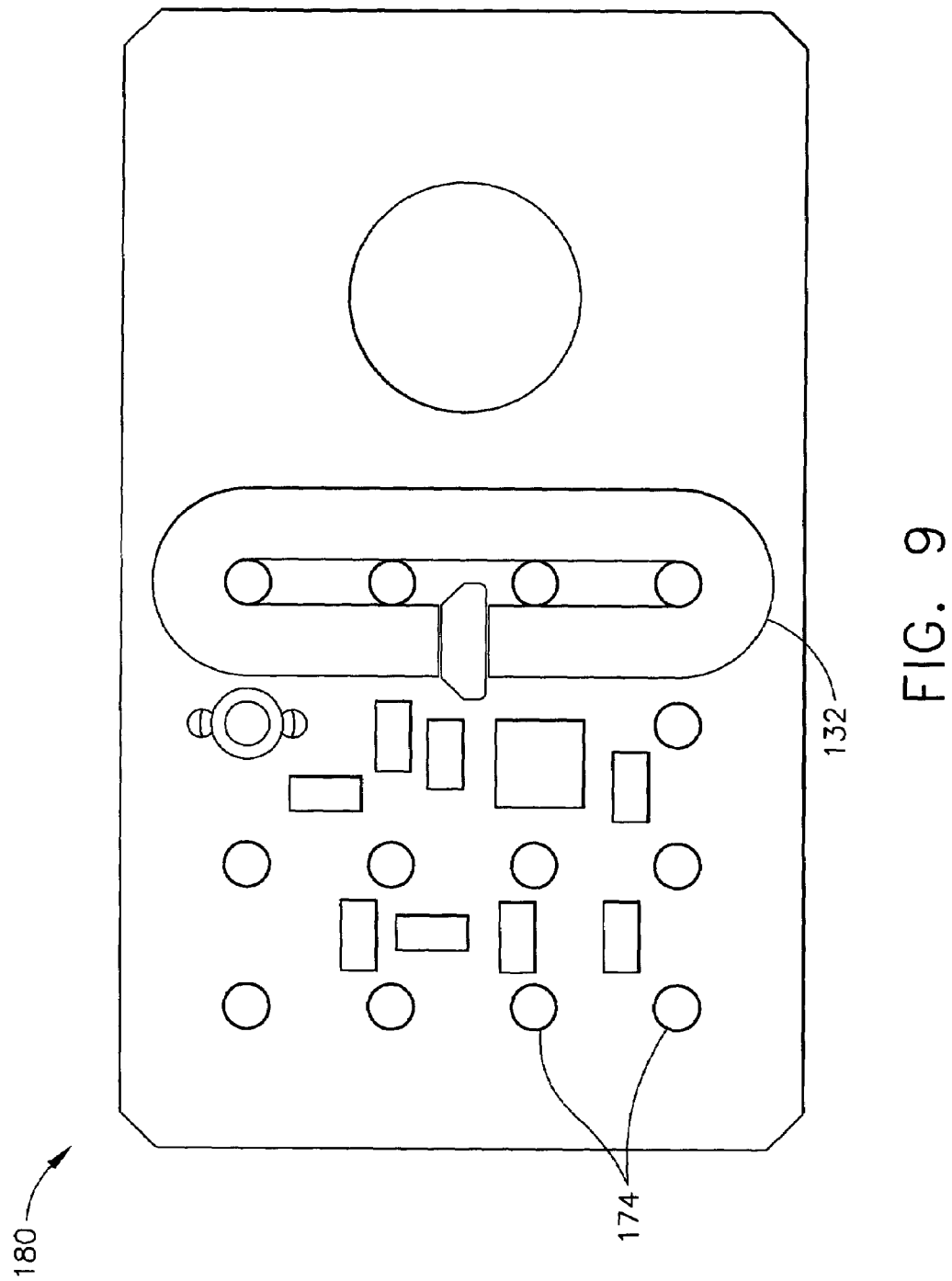
FIG. 9 is a bottom plan view of the printed wiring board included in the adapter module illustrated in FIG. 3.

FIGS. 5 and 6 illustrate an oblique view of a top and a bottom, respectively, of printed wiring board 180. Further, FIGS. 7, 8, and 9 illustrate a top plan view, a side view, and a bottom plan view, respectively, of printed wiring board 180. Socket pins 174 may extend through board 180 as illustrated and may be frictionally held in place. Magnetic core 132 may surround socket pins 174 as illustrated and, as discussed above in conjunction with FIG. 1, may detect the magnetic field from the fault current flowing through socket pins 174 onto multiple conductive windings 134 (not shown).

Figure 10:
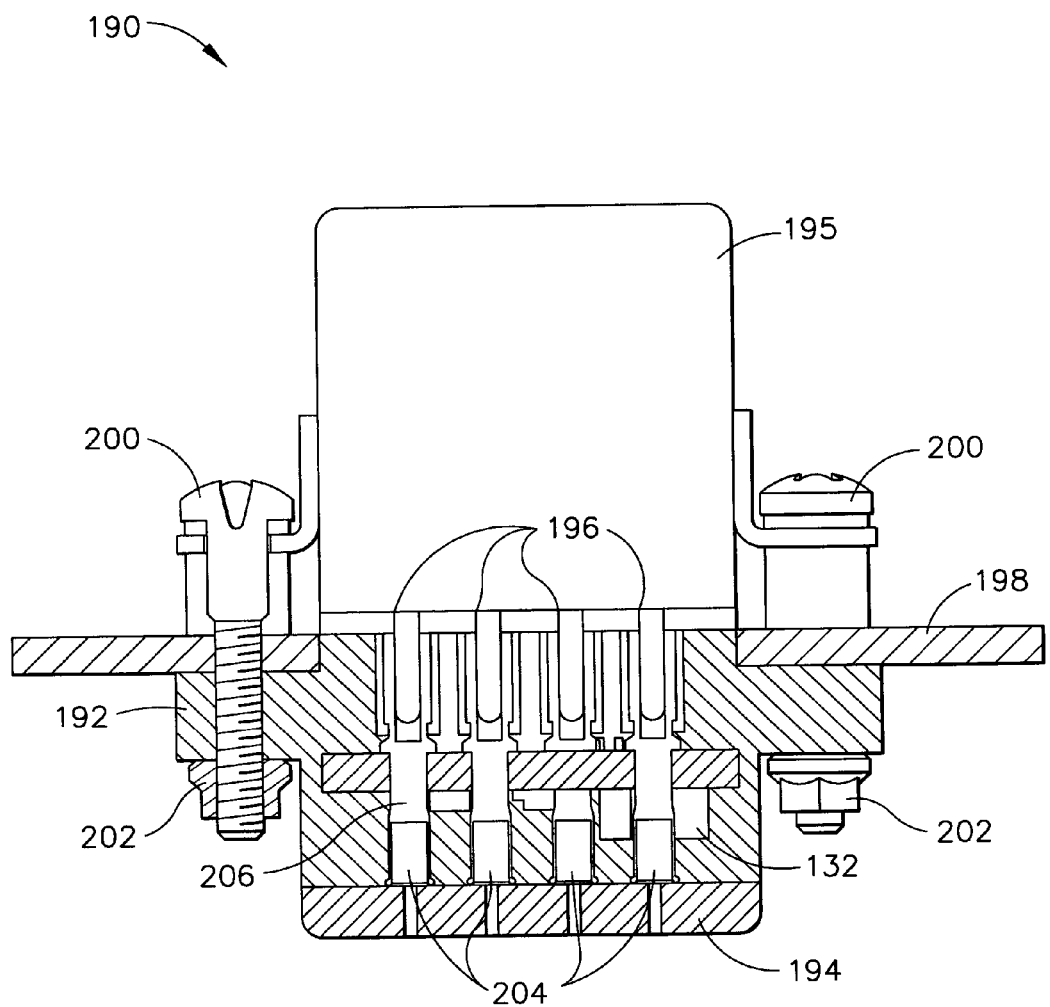
FIG. 10 is a cross sectional view of another embodiment of a fault interrupter module in accordance with the present invention.

Turn now to FIG. 10 which illustrates a cross sectional view of a fault interrupter module 190 in accordance with the present invention wherein module 190 includes electronic circuit 120. In this embodiment, electronic circuit 120 includes a relay system as described above instead of circuit breaker system 121. Module 190 may include an adapter module 192 mounted on a panel 198. Panel 198 may include electronic circuitry in electrical communication with module 192 and an external electrical system (not shown). The external electrical system may be, for example, a fuel pump circuit, a motor circuit, a gas pump circuit, or the like. Adapter module 192 may include electrical fault indicator circuitry (i.e. GLFI 130 (see FIG. 1)). An encapsulant 194 may be positioned on module 192 as illustrated to provide protection for the electrical components included within module 192.

An electrical circuit module 195 may be mounted onto adapter module 192 as illustrated. Further, module 190 may be held together and to panel 198 by bolts 200 and nuts 202. It will be understood, however, that module 190 may be held together by using screws, clamps, an adhesive, a clasp, friction, or the like.

Electrical circuit module 195 may include an electrical relay device or a magnetically sensitive switch as discussed above. Further, module 195 may include external electrical interconnects 196 extending from module 195 and through relay interconnect throughholes 206 and adapter module 192 and into socket 204. In this embodiment, socket 204 may be included within adapter module 192. External electrical interconnects 196 may make an electrical connection to adapter module 192 and, consequently, the external electrical system. External electrical interconnects 196 may extend through magnetic core 132 so that multiple conductive windings 134 may measure the magnetic field from the current flowing through external electrical interconnects 196 when a fault condition exists (i.e. $i_{gnd\ fault}$ or $i_{line\ fault}$).

Figure 11:
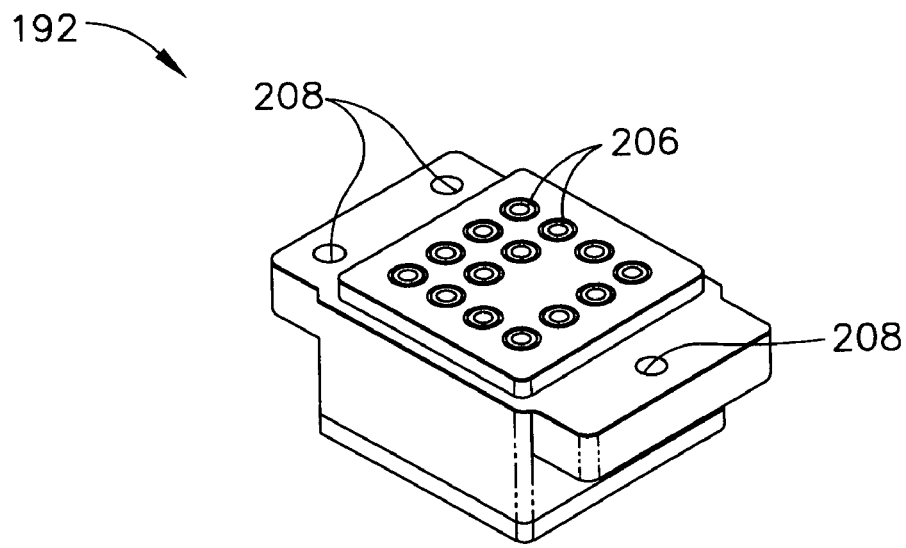
FIG. 11 is an oblique top view of the fault interrupter module illustrated in FIG. 10.
Figure 12:
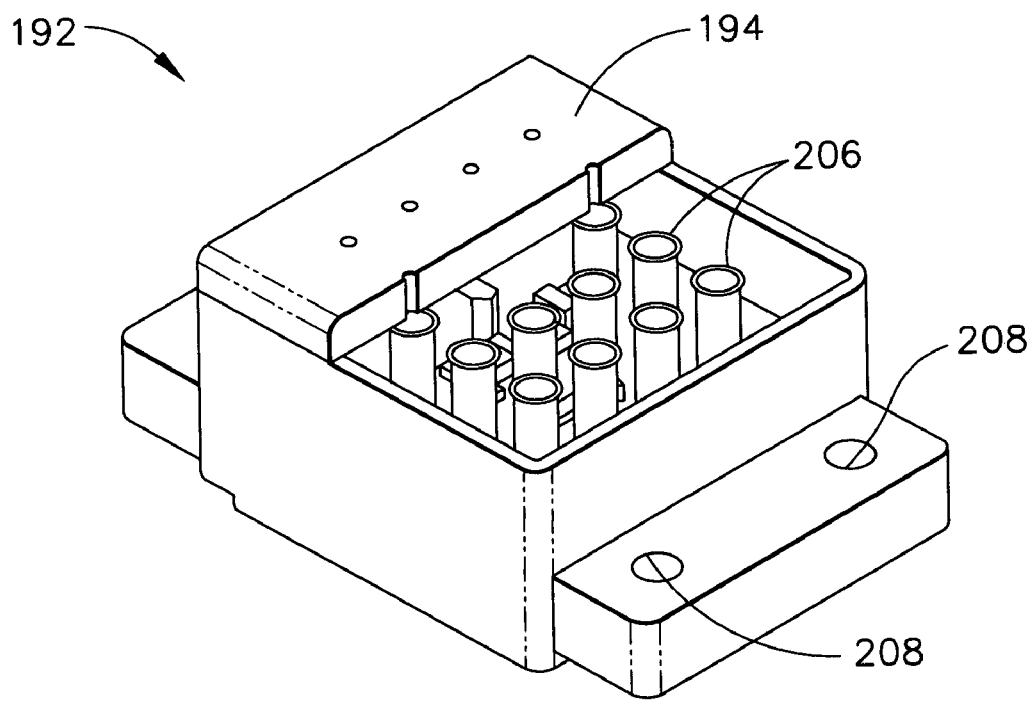
FIG. 12 is an oblique bottom view of the fault interrupter module illustrated in FIG. 10.

Turn now to FIGS. 11 and 12 which illustrate an oblique top view and an oblique bottom view, respectively, of fault interrupter module 190 illustrated in FIG. 10. As illustrated in FIGS. 11 and 12, fault interrupter module 190 includes bolt throughholes 208 mounted on a periphery of module 208. Throughholes 208 are for receiving bolts 200 as illustrated in FIG. 10.

Hence, adapter module 192 with the ground and line fault indicator function can be positioned within the electrical wiring system with minimal impact and cost. Further, if electrical circuit module 195 should fail, then module 195 may be replaced without having to replace or remove adapter module 192. Still further, socket 204 has been integrated within adapter module 192 to form a more compact module.

Figure 13:
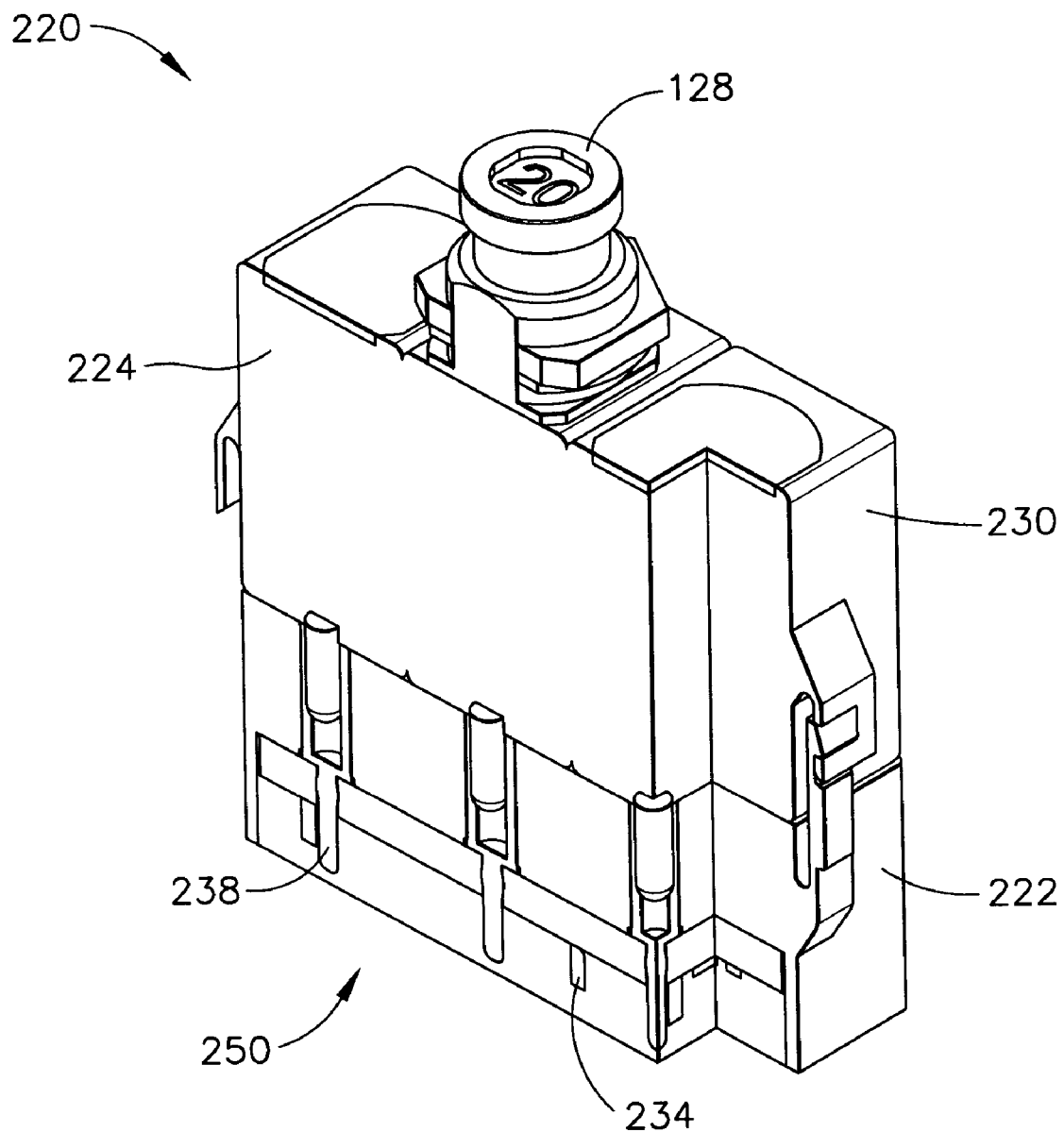
FIG. 13 is an oblique partial cut-away view of another embodiment of a fault interrupter module in accordance with the present invention.

Turn now to FIG. 13 which illustrates an oblique partial cut-away view of a fault interrupter module 220 in accordance with the present invention wherein module 220 includes electronic circuit 120. In this embodiment, electronic circuit 120 includes circuit breaker system 121 as illustrated in FIG. 1 and as described above. It will be noted that only circuit breaker 128 is illustrated in FIG. 13. However, it will be understood that circuit breaker system 121 may also include circuit breakers 124 and 126 which are not illustrated in FIG. 13 for simplicity and ease of discussion.

Module 220 may include a panel 226 (See FIG. 14) onto which external electrical circuitry (not shown) may be positioned thereon. Module 220 may also include a circuit breaker module 224 positioned thereon panel 226. A fault interrupter adapter module 222 may be positioned on circuit breaker module 224. Circuit breaker module 224 and fault interrupter adapter module 222 may be held fixedly together by a clasp 230. However, it will be understood that modules 222 and 223 may be held together by bolts, screws, adhesives, friction, or the like.

In FIG. 13, a partial cut away view of fault interrupter adapter module 222 is illustrated. Module 222 may include socket contacts 238 for electrical communication with external electrical contacts 232 (See FIG. 15) extending from circuit breaker module 224. Socket contacts 238 are held fixedly in place by a printed wiring board 234. An encapsulant 236 may be positioned on fault interrupter adapter module 222 as illustrated to provide protection for the electrical components included therein.

Figure 14:
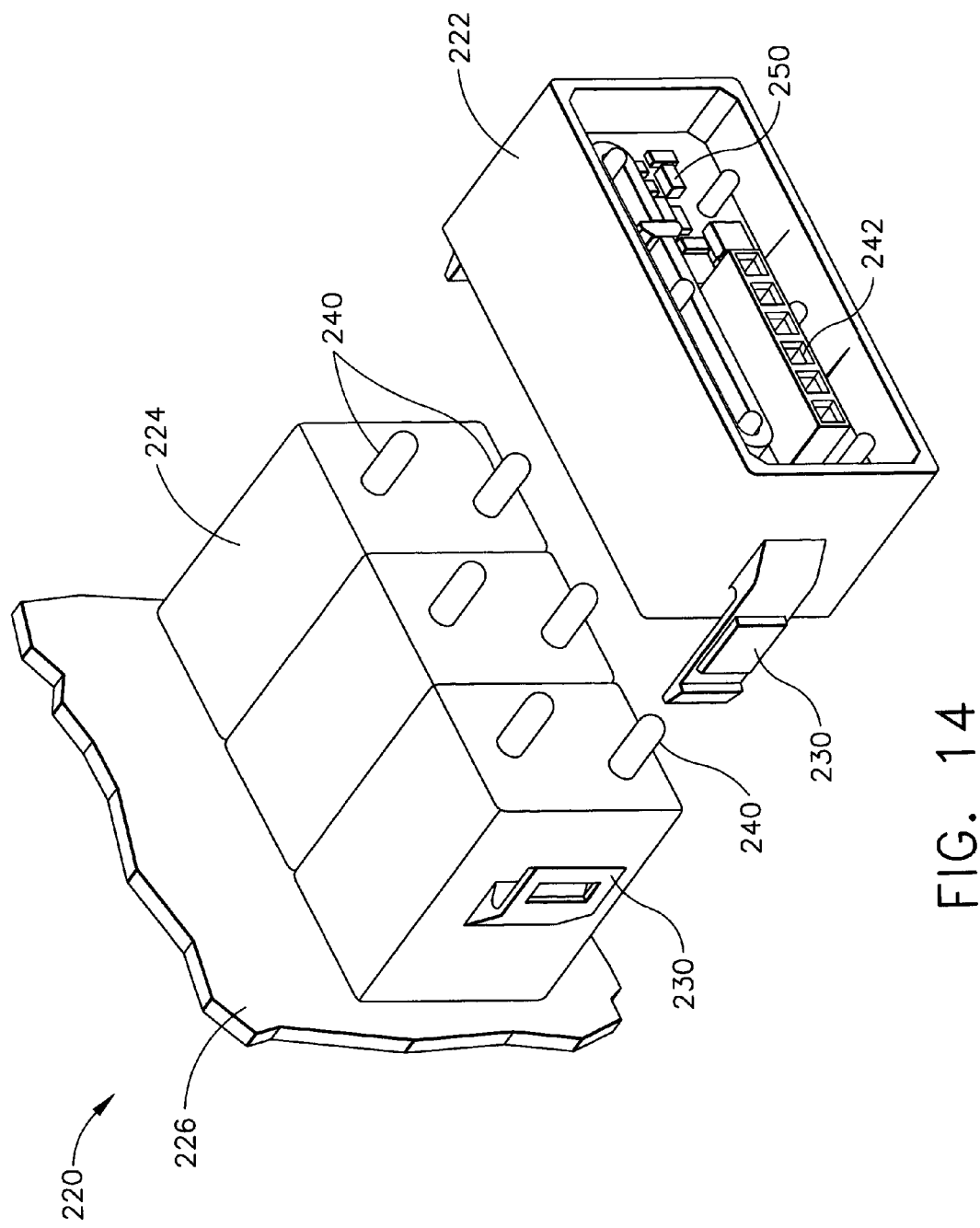
FIG. 14 is an exploded view of the fault interrupter module illustrated in FIG. 13.

Turn now to FIG. 14 which illustrates an exploded view of fault interrupter module 220. Module 222 includes an electrical interconnection 242 which may include a 6-contact crimp connector. Adapter module 222 may be mated with socket 224 through pin contacts 240 and fixedly held to socket 224 by clasp 230.

Hence, adapter module 222 with the ground and line fault indicator function may be positioned within the electrical wiring system with minimal impact and cost. Further, if circuit breaker module 224 should fail, then module 224 may be replaced without having to replace or remove adapter module 222.

Figure 15:
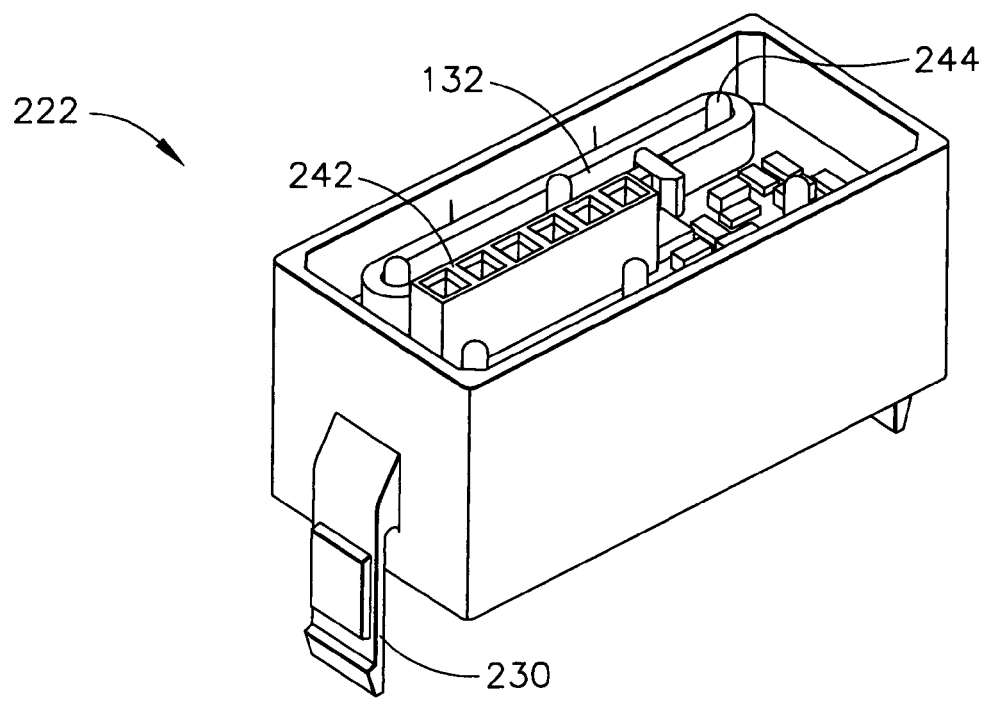
FIG. 15 is an oblique top view of the fault interrupter module illustrated in FIG. 13.
Figure 16:
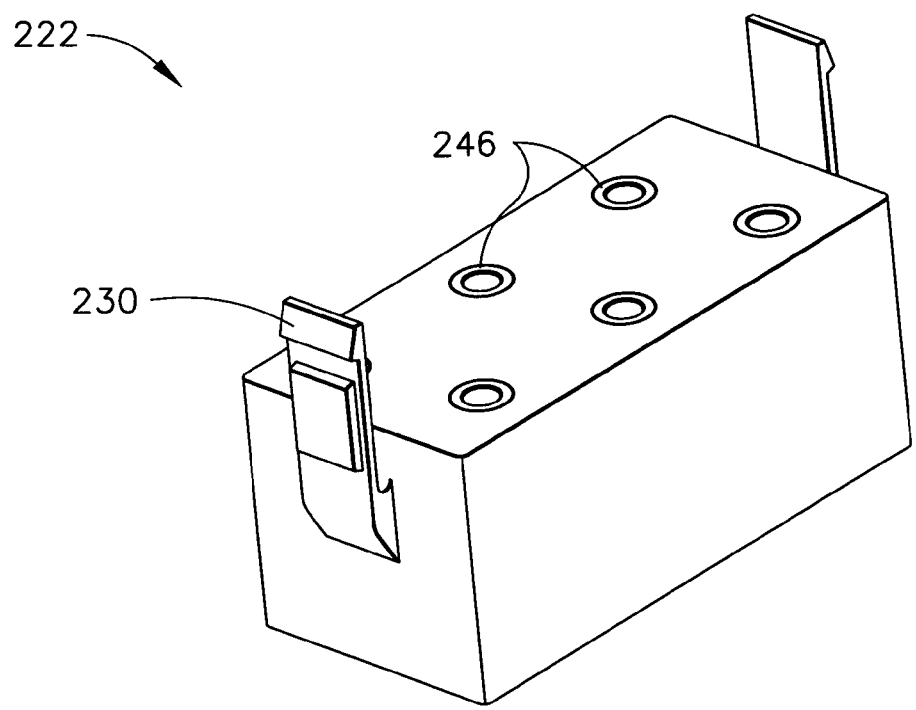
FIG. 16 is an oblique bottom view of the fault interrupter module illustrated in FIG. 13.

Turn now to FIGS. 15 and 16 which illustrate top and bottom oblique views, respectively, of fault interrupter adapter module 222. As illustrated, module 222 may include magnetic core 132 surrounding conductive pins 244 wherein magnetic core 132 may detect the magnetic field from a fault current flowing through conductive pins 244 (i.e. $i_{fault}$). Module 222 may include pin contact throughholes 246 (see FIG. 16) for pin contacts 240 to slidingly engage as illustrated in FIG. 14.

Figure 17:
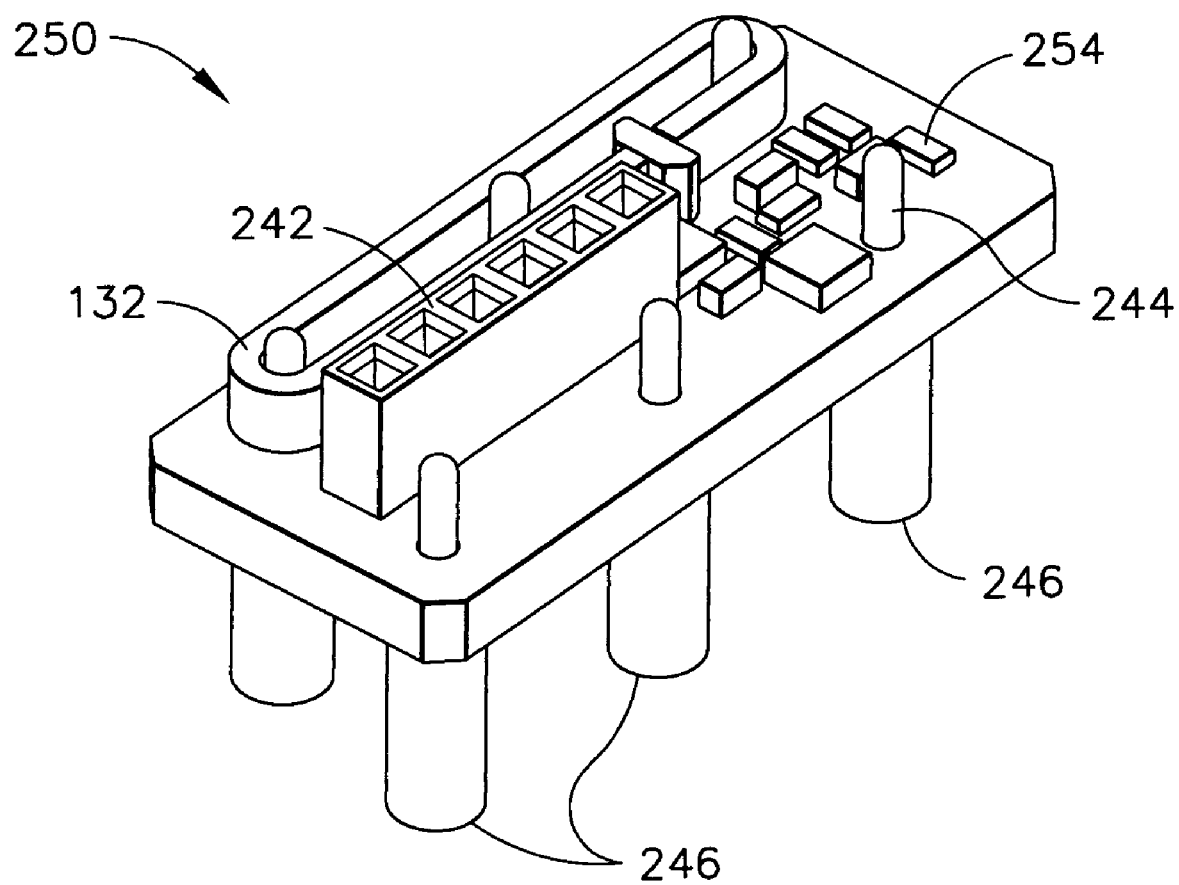
FIG. 17 is an oblique view of a printed wiring board included in the fault interrupter module illustrated in FIG. 13.

Turn now to FIG. 17 which illustrates an oblique view of printed wiring board 250. Printed wiring board 250 may include control circuitry 254 positioned thereon wherein control circuitry 254 may include at least one of the test or reset circuits illustrated in FIG. 1. Conductive pins 244 may extend through board 250 as illustrated and may be frictionally held in place. Magnetic core 132 may surround conductive pins 244 as illustrated and, as discussed above in conjunction with FIG. 1, may detect the magnetic field from the fault current flowing through conductive pins 244 onto multiple magnetic device windings 134 (not shown). Further, pin contact throughholes 246 may receive circuit breaker 128 to allow electrical communication between circuit breaker 128 and conductive pins 244.

It will be understood that the illustration of electronic circuit 120 with GLFI 130 is for simplicity and ease of discussion. Thus, in the above discussion, it will be understood that electronic circuit 120 may include a ground fault indicator circuit (GFIC) or a line fault indicator circuit (LFIC) other than GLFI 130 as illustrated in FIG. 1. For example, some GFIC's and LFIC's may include a magnetic device, such as a Hall effect device, for detecting $I_{gnd\,fault}$ or $I_{line\,fault}$ when a fault condition exists. Further, some GFIC's and LFIC's may include a magnetic field concentrator positioned proximate to the magnetic device wherein the magnetic field concentrator may focus the magnetic field from $I_{gnd\,fault}$ or $I_{line\,fault}$ onto the magnetic device.

It should be understood, of course, that the foregoing relates to preferred embodiments of the invention and that modifications may be made without departing from the spirit and scope of the invention as set forth in the following claims.

We claim:

1. A ground and line fault interrupter comprising:
   a magnetic core, wherein at the most three load wires of a three phase electrical circuit are fed directly through said magnetic core, and wherein said magnetic core is capable of detecting a magnetic field from at least one fault current flowing through said load wires;
   a unit of multiple conductive windings, wherein no more than one unit of multiple conductive windings is wound on said magnetic core providing a first output voltage and a second output voltage and being magnetically coupled to said magnetic core, wherein said first output is directly proportional to a line-to-ground fault level, and wherein said second output is directly proportional to a line-to-line fault level;
   a first sensing circuit being electrically connected to said multiple conductive windings and monitoring said first output voltage, wherein said first sensing circuit detects line-to-ground fault conditions between at least one of said load wires and ground;
   a second sensing circuit being electrically connected to said multiple conductive windings and monitoring said second output voltage, wherein said second sensing circuit detects line-to-line fault conditions between at least two of said load wires; and
   a printed wiring board circuit breaker being electrically connected to an output of said first sensing circuit and an output of said second sensing circuit, wherein said printed wiring board circuit breaker receives a line-to-ground fault condition signal from said first sensing circuit or a line-to-line fault condition signal from said second sensing circuit, wherein said printed wiring board circuit breaker is tripped and generates an electronic fault signal when at least one of said received fault condition signals exceeds a preset threshold; and wherein said electronic fault signal activates an external circuit breaker system that is electrically connected to said three-phase system.

2. The module of claim 1, wherein each of said first and second sensing circuits includes:
   an impedance with a first terminal and a first opposed terminal, the first terminal of said impedance being electrically connected to of said multiple conductive windings, wherein said impedance is a load that provides a voltage drop in said first or second output voltages;
   a rectifier with a second terminal and a second opposed terminal, the second terminal of said rectifier being electrically connected to the first opposed terminal of said impedance, wherein said rectifier rectifies said dropped voltage;
   an electronic filter with a third terminal and a third opposed terminal, the third terminal of said electronic filter being electrically connected to the second opposed terminal of said rectifier, wherein said filter characteristics are adjusted to balance a trip time with a number of false trips, and wherein said filter filters said dropped voltage; and
   a comparator with a fourth terminal and a fourth opposed terminal, the fourth terminal of said comparator being electrically connected to the third opposed terminal of said electronic filter, the fourth opposed terminal of said comparator being electrically connected to the input of said printed wiring board circuit breaker.

3. The module of claim 1 wherein said three phase circuit includes at least one switch capable of receiving the electronic fault signal.

4. The module of claim 3 wherein said three phase circuit is electrically connected to at least one load impedance through said at least one switch.

5. The module of claim 4 wherein said three phase circuit and said at least one load impedance are electrically connected through a conductive interconnect which extends through said magnetic core, said conductive interconnect being electrically connected in series with said at least one switch.

6. The module of claim 1 wherein the output of said first sensing circuit is electrically connected to a first input of an OR gate and the output of said second sensing circuit is electrically connected to a second input of said OR gate wherein an output of said OR gate is electrically connected to the input of said printed wiring board circuit breaker.

7. A fault interrupter module comprising:
   a relay socket module electrically connected to external electrical circuitry;
   an ground and line fault interrupter adapter module fixedly attached to said relay socket module, said adapter module including:

a magnetic core capable of detecting a magnetic field from at the most three fault currents fed directly through said magnetic core;

a unit of multiple conductive windings, wherein no more than one unit of multiple conductive windings provides a first and a second output voltage, said multiple conductive windings being magnetically coupled to said magnetic core;

first and second sensing circuits electrically connected to said multiple conductive windings, said sensing circuits being capable of detecting a line-to-ground fault from the first output voltage of said multiple conductive windings and a line-to-line fault from the second output voltage of said multiple conductive windings;

a analog operating circuit breaker detector electrically connected to said sensing circuits, said circuit breaker outputting an electronic fault signal when at least one of the line-to-ground and the line-to-line faults are detected; and a relay module electromagnetically coupled with electrical circuitry of said ground and line fault interrupter adapter module, said relay module being in electrical communication with said relay socket module through conductive interconnects extending through said magnetic core, said relay module including a switch electrically activated by the electronic fault signal.

8. A method of detecting an electronic fault in a circuit, the method comprising the steps of:

detecting a magnetic field from a fault current flowing through a switch in said circuit using a magnetic core and a unit of multiple conductive windings, wherein no more than one unit of multiple conductive windings is wound on said magnetic core, converting said fault current fed through said magnetic core into a line-to-ground fault signal and a line-to-line fault signal;

measuring the line-to-ground fault signal by comparing the ground fault signal to a ground fault reference signal;

measuring the line-to-line fault signal by comparing the line fault signal to a line fault reference signal;

constantly monitoring said fault signals;

tripping a circuit breaker detector if at least one of said ground and line fault signals exceeds a threshold;

generating an electronic fault signal;

opening said switch with said generated electronic fault signal to create an open circuit when the ground fault signal is greater than or equal to the ground fault reference signal; and opening said switch to create an open circuit when the line fault signal is greater than or equal to the line fault reference signal.

9. The method of claim 8 wherein said step of comparing the line fault signal to the line fault reference signal includes a step of measuring a voltage across an impedance.

10. The method of claim 8 wherein said steps of comparing the ground fault signal to the ground fault reference signal includes a step of measuring a voltage across an impedance.

11. The method of claim 8 wherein said step of opening said switch includes a step of flowing a ground fault current greater than one Amp through said switch.

12. The method of claim 8 wherein said step of opening said switch includes a step of flowing a line fault current greater than 90 Amps through said switch.

13. The method of claim 8 wherein said step of detecting the magnetic field with said magnetic device includes a step of inducing a current in said magnetic core.

14. The method of claim 8 wherein said step of measuring the line and ground fault signals includes a step of rectifying at least one of the line and ground fault signals.

15. The method of claim 14 wherein said step of measuring the line and ground fault signals includes a step of filtering at least one of the line and ground fault signals.

16. A method of detecting an electronic fault in a circuit, the method comprising the steps of:

providing a three phase circuit including only three electrical sources electrically connected to an impedance load through at least one switch and being directly fed through at least one conductive interconnect;

measuring a current flowing through said at least one conductive interconnect to determine a line-to-ground fault signal and a line-to-line fault signal;

comparing the line-to-ground fault signal with a ground reference current and comparing the line-to-line fault signal with a line current;

generating an electronic fault signal if said line-to-ground fault signal or said line-to-line fault signal exceeds a preset threshold; and opening said switch with said generated electronic fault signal to create an open circuit if the line-to-ground fault signal is greater than or equal to the ground reference current or if the line-to-line fault signal is greater than or equal to the line current.

17. The method of claim 16 wherein said step of measuring the current flowing through said at least one conductive interconnect includes measuring a magnetic field with multiple conductive windings.

18. The method of claim 17, further including a step of choosing the ground and line currents by choosing a number of turns in said multiple conductive windings.

19. The method of claim 16 wherein said step of comparing the ground fault signal with the ground reference signal and the line fault signal to the line reference signal includes a step of measuring a voltage across an impedance.

20. The method of claim 16 wherein said step of measuring the line and ground fault signals includes a step of rectifying at least one of the line and ground fault signals.

21. The method of claim 20 wherein said step of measuring the line and ground fault signals includes a step of filtering at least one of the line and ground fault signals.

22. The method of claim 21 wherein the step of filtering at least one of the line and ground fault signals includes a step of adjusting a frequency characteristic of an electronic filter to obtain a desired filter characteristic.

23. A method of providing electronic fault detection in a circuit, the method comprising the steps of:

providing at least one electrical circuit module in electrical communication with a connection in said circuit, said at least one electrical circuit module including at least one electrical interconnect and at least one switch;

removing said at least one electrical circuit module from said connection in said circuit;

providing an adapter module which includes electrical line-to-ground and line-to-line fault indicator circuitry, said adapter module being positioned in said connection in said circuit;

positioning said at least one electrical circuit module on said adapter module, said at least one electrical interconnect extending through said electrical line-to-ground and line-to-line fault indicator circuitry to make electrical contact with said circuit;

detecting a fault current flowing through said at least one electrical circuit module with said electrical line-to-ground and line-to-line fault indicator circuitry;
generating an electronic fault signal with said electrical line-to-ground and line-to-line fault indicator circuitry;
transmitting said electronic fault signal from said adapter module to said at least one switch; and
opening said at least one switch when said electronic fault signal is detected by said at least one switch.

24. A ground and line fault interrupter, comprising:
a magnetic core, wherein at the most three load wires of a three-phase system are fed directly through said magnetic core, said load wires providing three-phase power to an electrical load;
a unit of multiple conductive windings, wherein no more than one unit of multiple conductive windings is wound on said magnetic core, wherein arrangement of said windings on said magnetic core enables monitoring of the current flow through said load wires and detection of imbalances in the current flow;
a first sensing circuit electrically connected to said conductive windings, wherein said first sensing circuit electronically monitors said conductive windings and detects imbalances in the current flow through said load wires that indicate line-to-ground fault conditions;
a second sensing circuit electrically connected to said conductive windings, wherein said second sensing circuit electronically monitors said conductive windings and detects imbalances in the current flow through said load wires that indicate line-to-line fault conditions; and
an analog operating circuit breaker detector electrically connected to said first and second sensing circuits, wherein said circuit breaker detector receives a fault current from said first and second sensing circuits, and wherein said circuit breaker detector is tripped and generates an electronic fault signal if said received fault current exceeds a preset threshold.

25. The ground and line fault interrupter of claim 24, wherein said electronic fault signal generated by said circuit breaker detector trips a circuit breaker of an external circuit breaker system that is electrically connected to said three-phase system.

26. The ground and line fault interrupter of claim 24, wherein said circuit breaker detector is a printed wiring board circuit breaker set to trip on a lower current draw than said circuit breaker of said external circuit breaker system.

27. The ground and line fault interrupter of claim 24, wherein said electronic fault signal generated by said circuit breaker detector trips a relay of an external relay system that is electrically connected to said three-phase system.

28. The ground and line fault interrupter of claim 24, wherein said first sensing circuit includes an impedence electrically connected to a comparator through an electronic filter and rectifier, wherein said impedance is a load that provides a voltage drop which is rectified and filtered, and wherein the characteristics of said filter are adjusted to balance a trip time with a number of false trips.

29. The ground and line fault interrupter of claim 24, wherein said second sensing circuit includes an impedence electrically connected to a comparator through an electronic filter and rectifier, wherein said impedance is a load that provides a voltage drop which is rectified and filtered, and wherein the characteristics of said filter are adjusted to balance a trip time with a number of false trips.

30. The ground and line fault interrupter of claim 24, wherein said conductive windings are summed together to provide a first output voltage that is proportional to a ground fault level to said first sensing circuit and to provide a second output voltage that is proportional to a line fault level to said second sensing circuit.

31. The ground and line fault interrupter of claim 24, wherein the outputs of the comparators of the first and second sensing circuits are electrically connected to said circuit breaker detector through an OR gate.

32. The ground and line fault interrupter of claim 24, further including a test circuit, wherein said test circuit is electrically connected to said conductive windings and enables manual input of a fault current.

33. The ground and line fault interrupter of claim 24, further including a power supply electrically connected to said conductive windings.

34. The ground and line fault interrupter of claim 33, wherein said power supply is a 115 VAC system without external connections.

35. The ground and line fault interrupter of claim 24, further including a reset circuit electrically connected to said circuit breaker detector, wherein said reset circuit enables the manual reset of said circuit breaker detector if tripped.

36. A ground and line fault interrupter adapter module, comprising:
a plurality of relay interconnect throughholes capable of receiving external electrical interconnects of an electrical circuit module;
at the most three socket pins extending said adapter module, wherein said socket pins provide electrical communication between said external electrical interconnects and a socket;
a plurality of bolt throughholes positioned proximate to the periphery of said adapter module, said throughholes receiving bolts that slide through, wherein said bolts secure said adapter module between said electrical circuit module and said socket; and
ground and line fault interrupter circuitry, including:
a magnetic core surrounding said socket pins, said socket pins being fed through said magnetic core, and said magnetic core detecting a magnetic field from the current flowing through said socket pins;
a unit of multiple conductive windings, wherein no more than one unit of multiple conductive windings is wound on said magnetic core, said windings being arranged on said magnetic core to enable monitoring of the current flow through said socket pins;
first and second sensing circuits electrically connected to said conductive winding, said sensing circuits detecting imbalances of the current flow between each of said socket pins indicating line-to-line fault conditions and detecting imbalances of the current flow between at least one of said socket pins and ground indicating line-to-ground fault conditions, and generating a fault current; and
a printed wiring board circuit breaker electrically connected with said first and second sensing circuits, said circuit breaker receiving said fault current from said sensing circuits, wherein said circuit breaker is tripped and generates an electronic fault signal when said received fault current exceeds a preset threshold, wherein said generated electronic fault signal is sent to said electrical circuit module.

37. The ground and line fault interrupter adapter module of claim 36, wherein said ground and line fault interrupter circuitry further includes test circuit electronically connected to said conductive windings and reset circuit electronically connected to said circuit breaker and wherein said adapter module includes a control circuit panel providing control switches for said test and reset circuits.

38. The ground and line fault interrupter adapter module of claim 36, wherein said socket is mounted on a panel, and wherein said panel is in electrical communication with said socket and external electronic circuitry.

39. The ground and line fault interrupter adapter module of claim 38, wherein said electrical circuit module includes a circuit breaker system, and wherein said electronic fault signal activates said circuit breaker system to interrupt the power supply for a load electrically connected with said external electronic circuitry.

40. The module of claim 38, wherein said external electronic circuitry is in electrical communication with at least one of a fuel pump circuit, an engine circuit, and a gas pump circuit.

41. The module of claim 38, wherein said external electronic circuitry is positioned proximate to a flammable material.

* * * * *